March 11, 1930.  F. N. WOODMAN  1,749,932
SECTIONAL CONVEYER BELT
Filed July 27, 1928

Inventor
Francis N. Woodman
By attorneys
Southgate Hay + Hawley

Patented Mar. 11, 1930

1,749,932

UNITED STATES PATENT OFFICE

FRANCIS N. WOODMAN, OF CLINTON, MASSACHUSETTS, ASSIGNOR TO WICKWIRE SPENCER STEEL COMPANY, OF NEW YORK, N. Y., A CORPORATION OF DELAWARE

SECTIONAL CONVEYER BELT

Application filed July 27, 1928. Serial No. 295,809.

This invention relates to wire belts formed of interlaced spiral wire coils. It is frequently desired to use such belts in places where very wide belts are necessary even up to twelve or fourteen feet in width. It is extremely difficult to manufacture a spiral wire belt of such excessive width, and even if such a belt could be made, it would be subject to excessive distortion.

It is the object of my invention to provide a construction by which a wide belt of this type may be built up of several relatively narrow sections, such a belt possessing many substantial and important advantages which will be hereinafter pointed out.

A preferred form of the invention is shown in the drawings in which—

Figure 1:
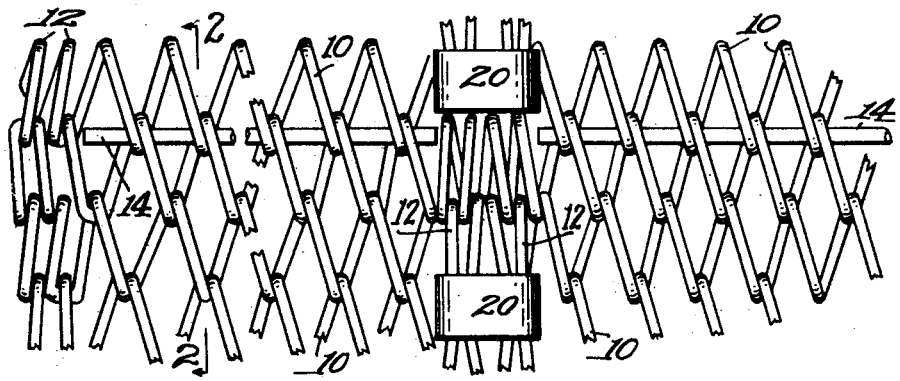
Fig. 1 is a plan view of a portion of my improved sectional belt.

Referring to the drawings, I have shown a conveyer belt made up of parallel sections of relatively narrow width. Each section is formed of spiral wire coils 10, interlaced together to form a species of mesh fabric. The end turns 12 of the spiral coils are compressed transversely of the belt to form reinforced selvage portions of increased strength and wearing qualities.

Reinforcing rods 14 are positioned between certain of the coils 10 and extend transversely of the woven sections, providing increased stiffness and preventing lateral shrinkage. The ends of the adjacent coils 10 are preferably twisted together and brought into alignment with the rods 14 to prevent lateral displacement thereof.

Having made up the narrow belt sections as above described, I place two or more of said sections side by side and join the adjacent selvages at successive points lengthwise of the belt. It is essential that the means for joining the selvages be such that the flexibility of the belt is left substantially unimpaired.

Figure 3:
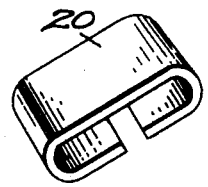
Fig. 3 is a perspective view of a double hook or clip.
Figure 2:
Fig. 2 is a longitudinal sectional elevation, taken along the line 2—2 in Fig. 1.

In the drawings, I have shown two devices for thus joining the selvages. In Figs. 1 and 3 I have shown double-ended hooks 20 which are adapted to be inserted with the ends open and to be clinched down to the position shown in Fig. 3, thus holding the adjacent selvage edges securely together.

The reinforced selvage edges above described provide increased strength at the points where the hooks 20 are applied and are thus essential to successful production of a sectional belt of this type. It has been found impractical to join sections having the usual non-reinforced edges.

Figure 4:
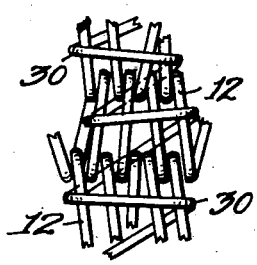
Fig. 4 is a partial plan view of a modified construction.

In Fig. 4, I have indicated a method of securing adjacent sections by lacing the sections together with a wire 30, said wire being of a suitable composition such as is commonly used in wire belt lacings.

A wide spiral conveyer belt made up in sectional form in accordance with my invention possesses very important advantages. In the first place, as above described, it is extremely difficult to manufacture very wide belts in single widths but a belt of any desired width may be built up by uniting successive sections of average width belt. For instance, a twelve foot belt may be built up from three sections of four foot belt or, if preferred, from four sections of three foot belt. A belt thus made in sections is reinforced and strengthened against longitudinal strain at each point where two sections are joined together, as at such points the belt will possess two reinforced selvages firmly secured together. Transverse shrinkage is also prevented by the introduction of the reinforcing rods 14 in each of the separate belt sections, at spaced points throughout the length thereof.

The useful life of a belt is also greatly increased, as it is found that the wear of a conveyer belt comes very largely along the outer edges and that a wide belt is frequently rendered useless on account of worn edges, while the inner portion of the belt is in good condition.

With my improved sectional belt it is merely necessary to replace the outer sections and the belt is then suitable for further use.

A wide one-piece belt may also be repaired by cutting away the worn edge portions, compressing the cut edges to form reinforced selvages, and adding edge sections to restore the original width of the belt.

Having thus described my invention and the advantages thereof, I do not wish to be limited to the details herein disclosed, otherwise than as set forth in the claims, but what I claim is:

1. A sectional wire conveyer belt comprising a plurality of relatively narrow belt sections, each section being formed of interlaced spiral wire coils and having the end turns of the wire coils compressed laterally to form reinforced selvage edge portions, and means to secure said edge portions together.

2. A sectional wire conveyer belt comprising a plurality of relatively narrow belt sections, each section being formed of interlaced spiral wire coils and having the end turns of the wire coils compressed laterally to form reinforced selvage edge portions, and means to secure said edge portions together while maintaining the flexibility of said belt substantially unchanged.

3. A sectional wire conveyer belt comprising a plurality of relatively narrow belt sections, each section being formed of interlaced spiral wire coils and having the end turns of the wire coils compressed laterally to form reinforced selvage edge portions, and means to secure the reinforced edge portions together at spaced points along adjacent edges.

4. A sectional wire conveyer belt comprising a plurality of relatively narrow belt sections, each section being formed of interlaced spiral wire coils and having the end turns of the wire coils compressed laterally to form reinforced selvage edge portions, and a plurality of double hooks engaging the selvage edge portions of said belt sections at spaced points and firmly securing said belt sections together.

In testimony whereof I have hereunto affixed my signature.

FRANCIS N. WOODMAN.